Feb. 12, 1957     P. ARBEIT     2,780,891
APPARATUS FOR MELTING GLASS
Filed May 11, 1951
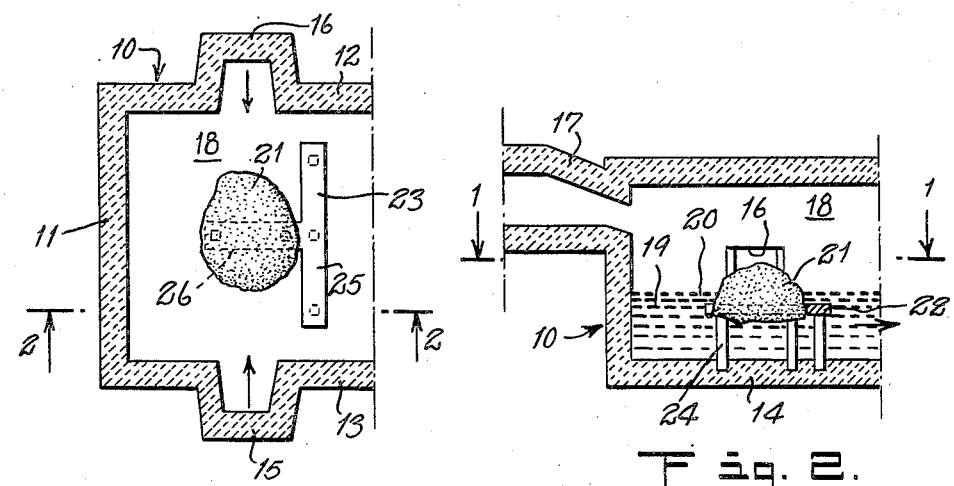
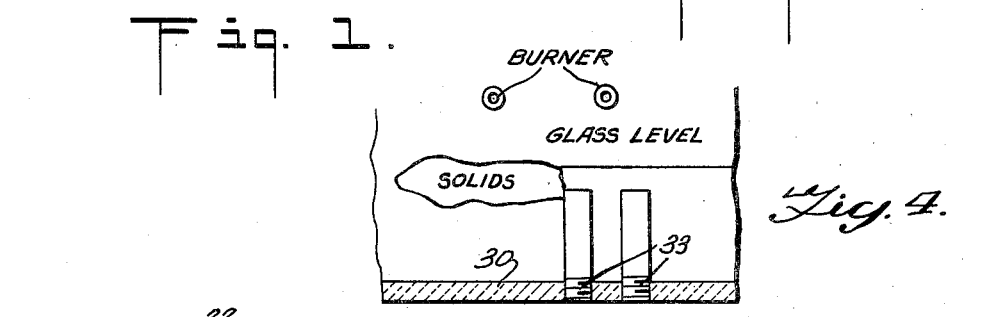
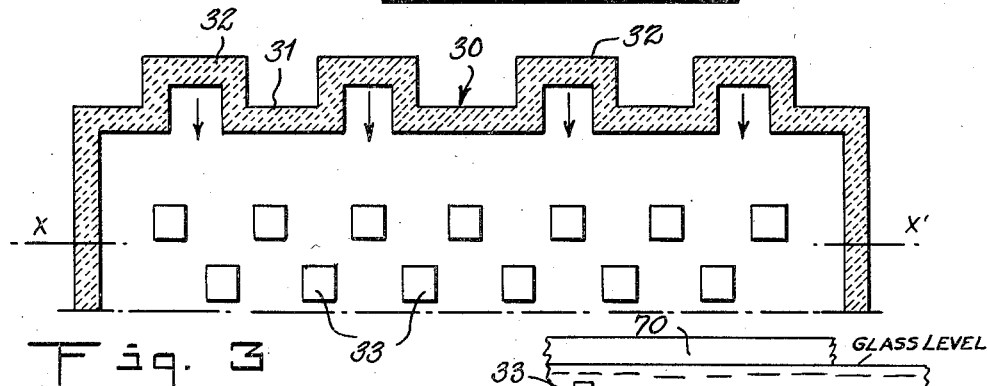
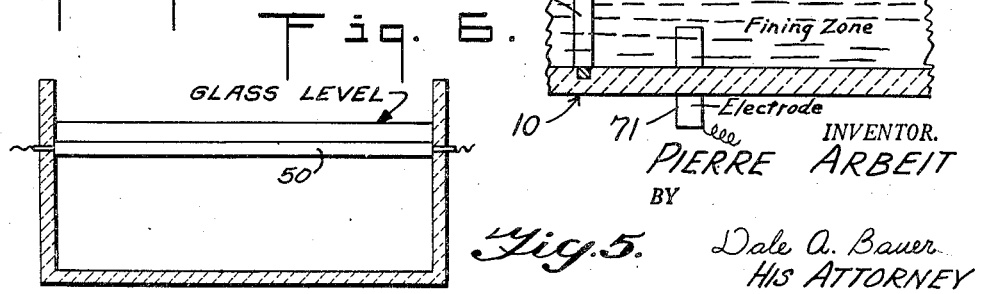
INVENTOR.
PIERRE ARBEIT
BY Dale A. Bauer
HIS ATTORNEY

United States Patent Office 2,780,891
Patented Feb. 12, 1957

2,780,891

APPARATUS FOR MELTING GLASS

Pierre Arbeit, Paris, France, assignor to Societe Anonyme des Manufactures des Glaces et Produits Chimiques de Saint-Gobain, Chauny & Cirey, Paris, France Application May 11, 1951, Serial No. 225,710

Claims priority, application France May 17, 1950

6 Claims. (Cl. 49—54)

This invention relates to the manufacture of glass in furnaces of the continuous type heated by flames or by Joule effect through the bath or by the two sources of heat and in which there is a flow of glass along the furnace from the area in which the lump is melted to the point of discharge. The invention also includes a glass furnace having particular construction conceived to overcome certain imperfections which have heretofore been inherent in such furnaces.

Glass furnaces of prior art type operating continuously and with flame melting of the solid raw materials are subject to the disadvantage that the flow of molten glass along the furnace carries the solid raw materials along the furnace and tends to mingle them with fined glass, to the confusion of the process and the imperfection of the product. This tendency is accentuated by the action of the burners themselves which act as jets to impel the floating solids, thus moving them out of the direct path of the flame itself and tending to disperse the solids, thus adding to inefficiency and imperfection. The mixture of vitrifiable materials is admitted to the furnace at one of its extremities where, because its density is less than that of the molten glass, it floats. This floating material has a tendency to be carried even to the other extremity of the furnace. A result of these effects is that the zone wherein the melting takes place must be made very long and hotter than theoretically needful throughout its extent in order to achieve a substantially total melting in this zone, despite which unmelted particles of raw materials enter into the products made from the glass, weaken them, lead to their rupture, make the product fragile, and frequently oblige the manufacturer to reject these defective products.

It is an object of the invention to improve the efficiency of furnaces of this type, to improve the quality of the product thereby, to reduce the dimensions of the melting zone or chamber of such furnaces and to reduce the cost of such furnaces by reducing the size and reducing the quantity of heat necessary to melt a given quantity of glass.

The present invention has for its object to provide material obstacles capable of retaining in the melting zone the glass making materials floating on the molten glass while still permitting the circulation of the molten glass at the surface as well as beneath the mass of raw materials.

According to the present invention the mass of glass-making materials may be retained in the melting zone by disposing therein discontinuous material obstacles rising at least to the level of the base of the mass of materials floating on the molten glass. It is also possible to use a material obstacle continuous over the entire width of the furnace, situated below the upper level of the glass bath and having a reduced height for enabling the circulation of the molten glass below and above said obstacle.

The mass of composition charged into the furnace constitutes a floating body which is rapidly rendered relatively compact by the commencement of the fusion of the materials composing the same and which sinks to a greater extent into the molten glass the more intense the load per unit area of the surface covered thereby. The submerged portion of this mass comes into contact with the obstacles and the latter, even when spaced apart, suffice to retain the whole of the mass which has not yet been fused. On the other hand, the current of molten glass is freely established beneath the obstacles, or between the latter in order to traverse the length of the furnace, be subjected to the appropriate treatments and arrive at the point of utilization.

The obstacles in accordance with this invention may be made of any material resistant to the action of glass, in particular, from graphite.

There is given below, by way of example, a description of two ways in which the invention may be carried into practical effect, applied to two different types of furnace, which will make it more easily understandable and from which will become clear certain other advantages thereof. In this description reference is made to the accompanying drawings, wherein:

Fig. 1 is a horizontal section through the melting zone of a furnace of the type described, the section being taken on the line 1—1 of Fig. 2.

Fig. 2 is the section on the line 2—2 of Fig. 1.

Fig. 3 is a horizontal section through the melting zone of a furnace embodying certain modifications.

Fig. 4 is a fragmentary longitudinal section through the part of the furnace of Fig. 3 devoted to the piles.

Fig. 5 is a diagram of a modification.

Fig. 6 is an electrically heated furnace in which the electrodes are located in the fining zone, downstream of the piles 33 of this invention.

Referring now to Figs. 1 and 2, numeral 10 indicates generally the upstream or loading end of a furnace of continuous type having an end wall 11, side walls 12, 13, sole 14, doghouses 15, 16 located in opposite walls 12, 13 near the wall 11. Two flame ports 17 are provided in wall 11 above the level of the glass, being directed downwardly as shown in Fig. 2 toward the general area into which the lumps from the doghouses float. The solid raw materials are melted in the melting zone 18 of the furnace and the glass 19, the surface of which is indicated at 20, flows in the direction of the arrows in Figs. 1 and 2 along the furnace toward a forehearth or other discharging device at the downstream end of the furnace.

Raw materials are admitted to the doghouses 15, 16, either mechanically or manually. It may be advantageous to proceed by the introduction of heavy charges intermittently and simultaneously through the two doghouses in such a manner as to cause the raw materials to accumulate in the form of a lump which rises substantially above the level of the glass and consequently penetrates below this level for a certain distance for instance several inches. The lump is subjected as shown at 21 to the impelling and melting action of the flame from burners 17. It is to be understood that the number of burners employed and their location can be as desired. The combined effect of the flame and the motion of the glass in the furnace in the direction of the arrows has a tendency to move the lump 21 away from the flame and into other zones, the fining or even the conditioning or working zones of the furnace before the lump has melted, so that solid particles are found in the finished glass. In this invention an obstruction 22 is provided beneath the surface of the glass, the obstruction in this instance consisting of a T shaped table 22 having legs 24 which are mounted in the sole of the furnace. This table is submerged slightly below the level of the glass so that the submerged portion of the lump 21 will of necessity engage its top and be stopped. The head 25 of the T is aligned across the furnace and is of sufficient extent to prevent the lump, as it moves outward from the doghouse, from escaping it and moving along the furnace. The bar 26 of the T is aligned longitudinally of the furnace and prevents the lump from being driven across to the wall by the flames or by submerged currents in the glass. As a result of the construction of the table the lump 21 comes to rest in direct line with, or at least in the region of greatest effect of, the burners 17 where it is held until melting is completed. The composition fuses, either at the surface under the action of the burners or in the lower regions, at the base of the lump, under the action of the convection currents in the glass returning from the lower regions of the hot portions of the furnace towards this zone which is cooled by the supply of the raw material as the obstacles are arranged to permit the circulation of the glass beneath the lump.

It may be advantageous in order to facilitate the rapid fusion of the glass making materials to have in the furnace means capable of accelerating the convection currents in the melting zone; such means may be constituted by the electrodes serving for the heating of the bath when the furnace is at least partly heated by Joule effect and which may be located in the fining zone or more particularly in the melting zone or in both melting and fining zones.

In Fig. 3 is shown a modification of the invention in which a furnace 30 has upstream end wall 31 in which are located a plurality of doghouses 32, four being illustrated in the drawing. Letters x, x' indicate the locations of flame burners similar to 17 at opposite sides of the melting zone near the doghouses. These burners may be of regenerative type working alternately as input and exhaust burners in accordance with known regenerator practice. Along the line swept by the flame issuing from burner x and burner x' are located piles 33 which extend upward from the bottom or sole of the furnace into proximity to the surface and which are arranged in staggered relation which offers no substantial obstruction to the passage of molten glass but constitutes an effective barrier to motion of the lumps along the furnace. The mass of composition, that is, the lumps, constitute in effect a floating body that is rapidly made relatively compact by the beginning of fusion and which is the more deeply submerged below the surface of the bath as the amount of the charge is greater per unit of surface in contact with the bath. The submerged part of the lump is obstructed by the obstacles which are adequately spaced to allow the flow of molten glass but insufficiently to permit the escape of lumps which have not been melted. The obstacles can be of any refractory material that is resistant to the action of molten glass, graphite being exemplary. In the case of graphite which is of less density than molten glass, the obstacles should be set into the sole and if they are made of a plurality of elements, their assembling can be made by screw threading, whereas in the case of materials having greater density than the glass they can be fitted in simple sockets in the sole. In the case of Figure 1 the table 22 may be of a material denser than glass in which the pillars 24 are set. But the table and the pillars may be of graphite, the table being screw threaded to the pillars.

In Figs. 1 and 2 the transverse bar 25 of the table is shown as being submerged and not extending over the entire width of the furnace. It must be understood that this submerged bar may be given a length sufficient to extend over the entire width of the furnace, while being or not associated with longitudinal bars such as 26. In case the submerged transverse bar extends over the whole width of the furnace, it may be supported by pillars such as 24 but this is not necessary and this bar may be mounted in/or supported by the lateral walls of the furnace or constituted as a floating barrier maintained submerged to the desired depth by any appropriate means, as shown in Fig. 5, wherein 50 is the barrier supported by the walls.

The obstruction is inert to the molten glass and is electrically inert in that it does not introduce electric current to the glass.

Fig. 6 includes a section 70 of a glass furnace 10 having piling 33 extending laterally across it and having one or more electrodes 71 extending into the furnace downstream of the piling.

Among the advantages of the invention are a reduction in the cost of melting a given quantity of glass which results in a reduction in the size and cost of the melting zone of furnaces, an improvement in the quality of glass produced by continuous furnaces, and a superior control of the lump after it leaves the doghouse.

In order to show the technical advantage of the present invention, in the course of a trial made according to the present invention in a flame-heated furnace, it has been possible to reduce the consumption of fuel oil by about 20% per kilogramme of glass produced of the same or even better quality.

In a trial made in another furnace heated by flames and comprising Joule effect electrodes in the fining zone, it has been possible to increase the production of glass by about 30%, with a consumption of thermal energy reduced by about 22% per kilogramme of glass.

As many apparently widely different embodiments of the present invention may be made without departing from the spirit and scope thereof, it is to be understood that the invention is not limited to the specific embodiments.

What is claimed is:

1. In a glass furnace of continuous type having side and end walls and a flow of glass from end to end along the longitudinal axis of the furnace tending to move solids along the furnace, inlet means in the furnace for the admission of solid raw materials, flame means acting upon the raw materials issuing from said inlet means and delivering flames having a tendency to move the solids about the furnace, and a wholly submerged, inert obstruction having a part at the level of the submerged part of the solid raw materials and being discontinuous from side wall to side wall below said part, said obstruction being in opposition to any force tending to impart motion to the solids, said obstruction having means to obstruct motion of the solids across the furnace and means to obstruct motion of the solids along the furnace, and providing for longitudinal flow of glass from wall to wall substantially throughout the width and depth of the furnace.

2. The furnace of claim 1 in which the obstruction comprises a table standing upon the sole of the furnace.

3. The furnace of claim 1 in which the obstruction comprises spaced inert piles extending across the furnace.

4. The furnace of claim 1 in which the obstruction comprises a line of staggered inert piles extending across the furnace.

5. The furnace of claim 1 in which the fining zone is provided with at least one electrode capable of generating a rising convection current of glass.

6. A glass making furnace of continuous flow type having a tank providing for the flow of melted glass along the furnace, means to add solid raw materials to the upstream end of said tank, fusing means comprising flame acting upon said raw materials, and mechanical obstruction means to fix the said raw materials in position in the said end of said tank and to exclude them from the adjacent part of said tank consisting essentially of wholly submerged, inert abutment means extending across the tank in contact with the raw materials, and having raw materials engaging parts wholly submerged a short distance below the surface of the glass, said obstruction being of vertical and horizontal dimensions providing unobstructed flow to surface glass, and substantially unobstructed flow throughout the width and depth of the tank to low and middle depth glass, lengthwise of the tank.

References Cited in the file of this patent

UNITED STATES PATENTS

| | | |
|---|---|---|
| 236,561 | Duryee | Jan. 11, 1881 |
| 1,486,992 | Slingluff | Mar. 18, 1924 |
| 1,641,898 | Neenan | Sept. 6, 1927 |
| 1,661,836 | Kutchka et al. | Mar. 6, 1928 |
| 1,744,359 | Brown | Jan. 21, 1930 |
| 1,759,228 | Drake | May 20, 1930 |
| 1,841,464 | Black | Jan. 19, 1932 |
| 1,906,695 | Lufkin | May 2, 1933 |
| 1,973,689 | Geer et al. | Sept. 11, 1934 |
| 2,267,537 | Romazzotti | Dec. 23, 1941 |
| 2,313,217 | Borel | Mar. 9, 1943 |
| 2,512,761 | Arbeit | June 27, 1950 |
| 2,513,732 | Mols | July 4, 1950 |

FOREIGN PATENTS

| | | |
|---|---|---|
| 19,777 | Great Britain | Oct. 15, 1892 |
| 110,235 | Australia | Mar. 26, 1940 |